Sept. 5, 1967        H. RUCHLIS        3,339,292
EDUCATIONAL PENDULUM DEVICE
Filed Oct. 22, 1965
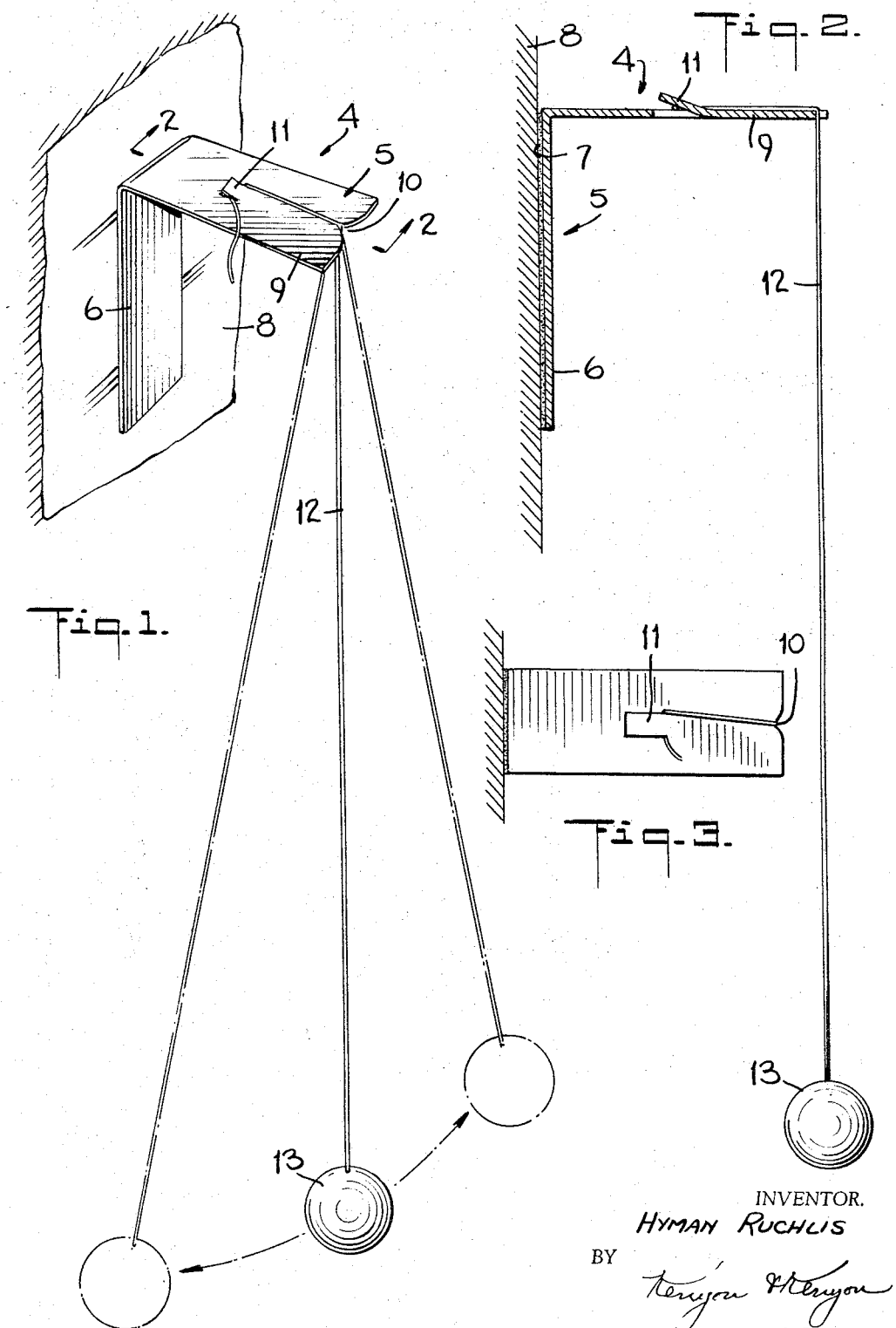
INVENTOR.
HYMAN RUCHLIS
BY
Kenyon & Kenyon
ATTORNEY 3,339,292
EDUCATIONAL PENDULUM DEVICE
Hyman Ruchlis, Brooklyn, N.Y., assignor to Harcourt, Brace & World, Inc., New York, N.Y., a corporation of New York
Filed Oct. 22, 1965, Ser. No. 500,723
2 Claims. (Cl. 35—19)

This invention relates to an educational pendulum device. More particularly, this invention relates to an educational pendulum device for demonstrating the effect of changing the length of a pendulum.

In the field of applied science projects of science education it is desirable to provide teaching devices and visual aids which are particularly adapted for limited classroom space and designed for either wall hanging or table mounted lecture presentation. These devices and apparatus must be capable of stimulating a student's interest, intensifying the student's retention of the physical principle being verified in the demonstration and motivating the student by personal involvement. Further, it is necessary that the teaching devices be of a construction which can be quickly and easily set up so that there will be a minimum of time taken from the lecture of the instructor in explaining the principle of the devices. Among the problems of achieving these ends are the problem of producing a production model at low cost, as well as the problem of providing an easily understandable model.

In the past, the educational devices which have been used to study the effect of changing the length of a pendulum have been of bulky construction and of relatively heavy weight. Several forms of these prior art devices have been made with a stand of solid one piece construction which supports the pendulum thereon. However, because of their construction, such devices are generally cumbersome to use and store. In addition, the length of the pendulum cannot be quickly and easily changed during a demonstration to show the effect of such. Still other prior art devices have been made of a plurality of interconnected components which, although easily stored, are cumbersome to use and require considerable time to set up for study. Further, these prior art devices have been found to be of relatively high cost with the result that it is necessary to use one device for a large group of children.

Accordingly, it is an object of this invention to provide an educational pendulum device for demonstrating the effect of changing the length of a pendulum.

It is another object of this invention to provide an educational pendulum device which is inexpensive to manufacture and simple to use.

It is another object of this invention to provide an educational pendulum device which is compact and easily stored.

It is another object of this invention to provide an educational pendulum device which can be removably mounted on a wall.

It is another object of this invention to provide an educational pendulum device which is easily understood.

Generally, the educational pendulum device consists of a bracket which is adapted for attachment to a wall or similar surface and which has an outwardly extending leg having a notched pivot formed in one edge and a friction lock means formed in an intermediate portion. The device further consists of a pendlum which is supported on the bracket and which is comprised of a flexible cord means and a pendulum weight supported at one end of the cord means in depending fashion. The cord means passes over the notched pivot and is secured in the friction lock means of the bracket. The securement of the cord means in the friction lock means of the bracket is such that the length of the pendulum formed by the cord means and supported weight can be quickly and easily changed so as to study the effect thereof.

These and other objects and advantages of the invention will become more apparent from the following detailed description and appended claims taken in conjunction with the accompanying drawings in which:

FIG. 1 illustrates a perspective view of an educational pendulum device according to this invention;

FIG. 2 illustrates a view of the device taken on line 2—2 of FIG. 1; and

FIG. 3 illustrates a top view of the device of FIG. 1 showing the cord in securement with a friction lock means.

Referring to the drawings, the educational pendulum device 4 has an L-shaped bracket 5 of any suitable material, such as, sheet metal, which is provided on the back of its depending leg 6 with a suitable removable securing means 7, such as, a two-sided adhesive tape for securement to a wall 8 or like surface, such as, a desk or blackboard. The bracket 5 has an outwardly extending leg 9 which when the bracket 5 is secured to the wall 8 projects from the wall 8. The outwardly extending leg 9 has a notched pivot 10 formed in its outermost edge which is sufficiently rounded to avoid any sharp wear edges. The leg 9 also has an upwardly directed integral tab 11 at an intermediate portion thereof which is formed in any suitable manner, for example by cutting, from the leg 9.

The educational pendulum device 4 also has a cord means 12 which supports a pendulum weight 13 at one end and which passes over the notched pivot 10 in the edge of the bracket leg 9 and around the integral tab 11 of the leg 9 to form a pendulum. The cord means 12 is secured by the tab 11 by being slightly wedged between the edge surfaces of the leg 9 as shown. Further, since the weight of the pendulum weight 13 is generally at a minimum, the frictional force between the cord means 12 and respective portions of the leg 9 and tab 11 is sufficient of itself to secure the cord means 12 in place.

Once the bracket 5 has been suitably secured to the wall 8 and the cord means 12 with the pendulum weight 13 has been secured thereto, the pendulum which is formed by the depending cord and weight can be studied. As shown in FIG. 1, the pendulum weight 13 is sufficiently spaced from the leg 6 to be swung in the conventional arcuate manner; however, when it becomes necessary to change the length of the pendulum to study the effect of such, the cord means 12 is quickly and easily moved between the tab 11 and the adjacent surfaces of the leg 9 so as to lengthen or shorten the pendulum and resecured thereto.

The educational pendulum device 4 can be easily mounted and removed from the wall 8 in any suitable manner in a minimum of time so that there will be a minimum loss of time from the total lecture period thereby allowing more time for explanation. Because of its simple construction, the device can be stored in a compact space and can be subjected to some degree of rough use without being damaged. Further, since the device 4 can be made at a low cost, a plurality of devices can be utilized by a single group of students so that sufficient time for close study can be made available to each student.

The pendulum device of this invention is in a sense but a dummy whose only function is to illustrate a physical proposition or relation. Thus, as a teaching tool, it is essential that the device not obscure the physical principle or relationship being illustrated. So it is that the device of this invention has its elegance in its simplicity rather than in a complexity.

Because of its simplicity, the pendulum device of this invention need not be a premium instrument in order to adequately illustrate the principle being taught. In addition, because the pendulum is mounted away from the bracket in depending fashion, the pendulum will appear to be supported freely as if by a "sky hook." This effect not only minimizes the visual impact of the bracket which has been inherent in bench supported stands but also avoids such matters as accurate vertical alignment or positioning of a stand or of this bracket 5.

Having thus described the invention, it is not intended that it be so limited as changes may be readily made therein without departing from the scope of the invention. Accordingly, it is intended that the subject matter described above and shown in the drawings be interpreted as illustrative and not in a limiting sense.

What is claimed is:

1. An educational pendulum device for demonstrating the effect of changing the length of a pendulum comprising an L-shaped bracket of a single thickness having an outwardly extending leg and a depending leg, said outstanding leg having a notched pivot formed in one edge thereof and a friction lock means formed in an intermediate portion thereof, said friction lock means including an integral tab directed from an intermediate portion of the surface of said outwardly extending leg; means on said depending leg for securing said bracket to a wall whereby said outwardly extending leg projects from said wall; and a pendulum supported on said bracket, said pendulum having a cord means passing over said notched pivot and secured between the surfaces of said tab and the adjacent surfaces of said outwardly extending leg, and a pendulum weight secured to the end of said cord means in depending fashion.

2. An educational device as set forth in claim 1 wherein said securing means is a two-sided adhesive tape.

References Cited
UNITED STATES PATENTS

| | | | |
|---|---|---|---|
| 822,231 | 5/1906 | Crosin | 24—130 X |
| 1,481,075 | 1/1924 | Strause | 35—19 |
| 2,627,124 | 2/1953 | Rock | 24—129 X |
| 2,729,480 | 1/1956 | Berndt | 24—129 X |

EUGENE R. CAPOZIO, *Primary Examiner.*

H. S. SKOGQUIST, *Assistant Examiner.*